June 24, 1958 E. R. WADLEIGH 2,840,109
ROTARY SELECTOR VALVE
Filed Feb. 25, 1957 2 Sheets-Sheet 1

INVENTOR.
ELBERT R. WADLEIGH
BY
Lynn H. Latta
—ATTORNEY—

June 24, 1958 E. R. WADLEIGH 2,840,109
ROTARY SELECTOR VALVE
Filed Feb. 25, 1957 2 Sheets-Sheet 2
Fig. 3
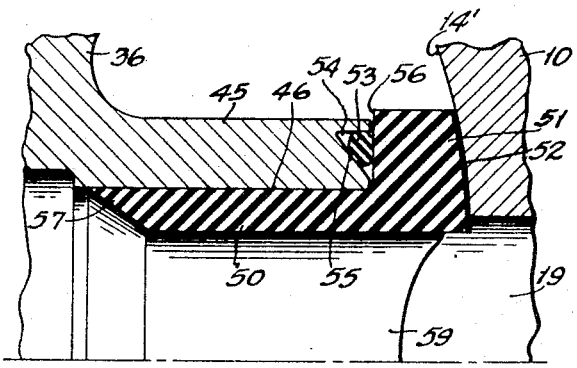
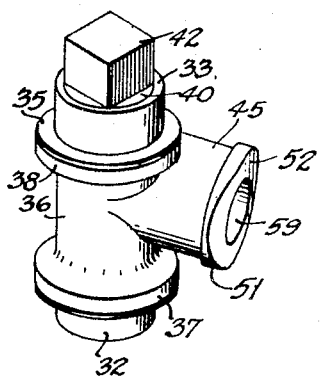
Fig. 4
Fig. 5
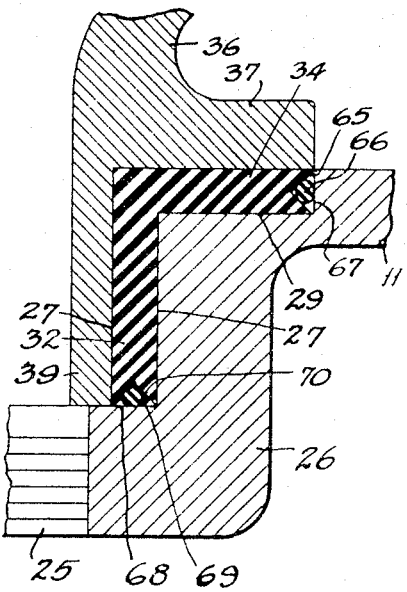
Fig. 6
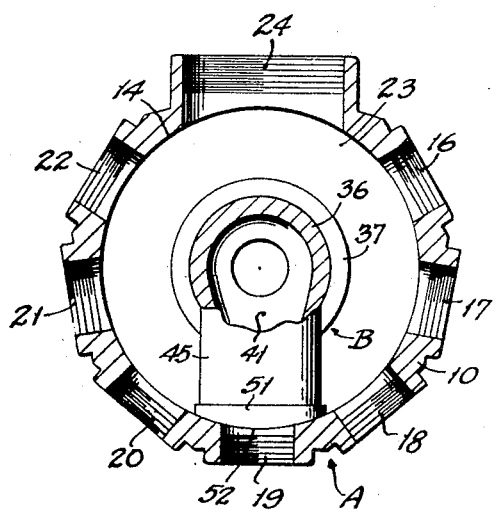
INVENTOR.
ELBERT R. WADLEIGH
BY
Lynn H Latta
—ATTORNEY—

United States Patent Office 2,840,109
Patented June 24, 1958

2,840,109

ROTARY SELECTOR VALVE

Elbert R. Wadleigh, Culver City, Calif., assignor, by mesne assignments, to Win-Well Manufacturing Company, Tulsa, Okla., a corporation of Delaware Application February 25, 1957, Serial No. 641,917

10 Claims. (Cl. 137—625.11)

This invention relates to rotary selector valves and more particularly to a rotary valve adapted to gather and merge the inflows from a plurality of fluid lines and to direct them to a common service outlet while simultaneously directing the inflow from an additional line to a separate outlet, maintaining that flow segregated from the flow to the common outlet, thus providing for selectively sampling the fluid from any of the input lines in order to determine the characteristics thereof (e. g. rate of flow, quality, amount of foreign material carried therein, or any other condition to be observed).

One of the primary objects of the invention is to provide a selector valve for use under conditions wherein the mating surfaces of the valve are subjected to difficult conditions of wear such as are encountered in the handling of crude oil flowing from a series of oil wells, and a major object of this invention is to provide a valve that will retain good operating characteristics throughout extended periods of service under such adverse conditions.

In particular, the invention contemplates an improved rotary selector valve having bearing surfaces utilizing a tough resinous plastic material having inordinately high wearing qualities and being capable of cold flowing into close mating contact with casing and rotor members to prevent fluid seepage between the mating surfaces. The invention further involves the discovery, in extended field tests, of an extremely improved ability (as contrasted to that of valves available in the prior art) to maintain adequate fluid tightness over long periods of service, in the presence of adverse conditions tending to cause wear, and in spite of recurrent changes in conditions such as temperature, fluid pressure, etc.

As used in the petroleum industry, the selector valve of my invention serves as a means to bring together a plurality of flows from a number of supply lines (e. g. lines coming from a series of different oil wells) and directing such flows through a relatively large service outlet to a storage tank. In petroleum producing operations, it is desirable to know the amount and qualities of production from the various wells of a group, the joint output of which is delivered to a common transfer line leading to a storage tank or the like, and heretofore it has been customary to provide in the respective incoming lines, manifolds having bypass valves by means of which the flow of any one of such incoming lines may be diverted from the common transfer line and directed to sampling and testing equipment.

When a product sample from a particular source was desired, it was necessary to shut off the fluid flow within the corresponding supply line, disconnect the line at the manifold and connect it to a secondary conduit leading to the sampling and testing equipment, then repeat the procedure in reverse sequence to reconnect the line to the manifold.

Certain selector valves have been used during recent years to perform the general function of the former manifold and, at the same time, eliminate the awkward and highly inefficient procedure formerly required to obtain test samples from each of a number of sources.

However, the handling of a heavy fluid, such as crude oil, under generally high line pressures is most difficult and the selector valves presently available for this purpose are found to be inefficient and generally incapable of meeting the exacting requirements of actual use. Even when first installed, some of them fail to completely segregate the product being diverted for sampling from the fluids in the other supply lines, and dilution and contamination occurs depending upon pumping pressures developed in the supply lines.

But even more important than the problems of seepage and siphoning due to variations in differential pressures, is that of interstitial leakage between the valve parts due to wear on their bearing surfaces. Unless the valves are frequently disassembled and carefully inspected for indications of excessive wear, discrepancies in samples taken and particularly in rate of flow checks are bound to occur for long periods of time before the presence of error due to faulty valve operation is even suspected.

With the foregoing and other considerations in mind, the present invention will be seen to have a number of objects.

One important object of this invention is the provision of a rotary selector valve in which interstitial fluid tightness is assured by the use of self-conforming bearing members adapted to cold flow into close juxtaposition with adjacent surfaces.

Another important object of this invention is the provision of a rotary selector valve with bearings having inherent self-conformability as previously described and which are further adapted to cooperate with readily compressible sealing members which are expandable and adjustable to compensate for possible wear.

A further important object of this invention is the provision of a rotary selector valve provided with separate bearing members and seals interfitted between its housing and rotor, and adapted to absorb a maximum share of the wear that does occur.

Another important object of this invention is the provision of a rotary selector valve having interfitting bearing members and seals, as described above, which may be easily removed and replaced when evidence of wear becomes apparent.

Another object of this invention is the provision of a rotary selector valve having replaceable bearing and sealing members and having one of such bearing members positioned in the complete valve assembly at a point at which the effects of wear upon it may be observed from the outside of the valve housing.

A still further important object of this invention is the provision of a rotary selector valve having a housing body and a movable rotor therein relatively dimensioned to provide optimum freedom of fluid flow around the rotor from a series of inlet ports to a main outlet.

In brief, the rotary selector valve of the present invention may include a cylindrical chamber being somewhat less in depth than in diameter, closed at the bottom and having a fluid-tight cap plate removably attached across its top. Radially disposed around the chamber wall are a plurality of inlet ports to which fluid supply lines are connected, and a single large outlet port of sufficient size to receive the combined input of all of the supply lines is also apertured in the sidewall and is connected exteriorly to a main output conduit leading to the main storage tank. A generally hollow T-shaped rotor is axially disposed in the center of the chamber and is journalled with interfitting Teflon bushings into the cap and bottom of the chamber.

A short tubular extension of the journalled rotor body is extended laterally from the hollow center thereof so as to align radially of the chamber with the openings of the inlet ports in the chamber sidewall. Into the open end of this tubular extension is fitted a Teflon seal bushing having a flanged head provided with an arcuate outer surface mating with the concave contour of the inner periphery of the chamber. The tubular extension communicates with the hollow interior of the rotor thus forming an L-shaped fluid passage terminated in an output port centered in the bottom of the chamber housing and opening into a supply line leading to the sampling and testing equipment.

An actuator stem for turning the rotor member is extended outwardly above the chamber enabling an operator to turn the inlet port of the rotor member into alignment with any one of the supply line inlet ports thereby diverting its fluid product from its normal path of flow through the chamber into the main outlet port, and directing it instead through the fluid passage of the rotary member into the secondary outlet line and to the test equipment.

Fig. 3 is a fragmentary detail sectional view taken on the line 3—3 of Fig. 2;

Fig. 4 is a perspective view of the rotor unit of the valve, with seals attached thereto;

Fig. 5 is a fragmentary detail sectional view taken on the line 5—5 of Fig. 2; and Fig. 6 is a diametric section of the valve with the rotor shown in end elevation.

Figure 1:
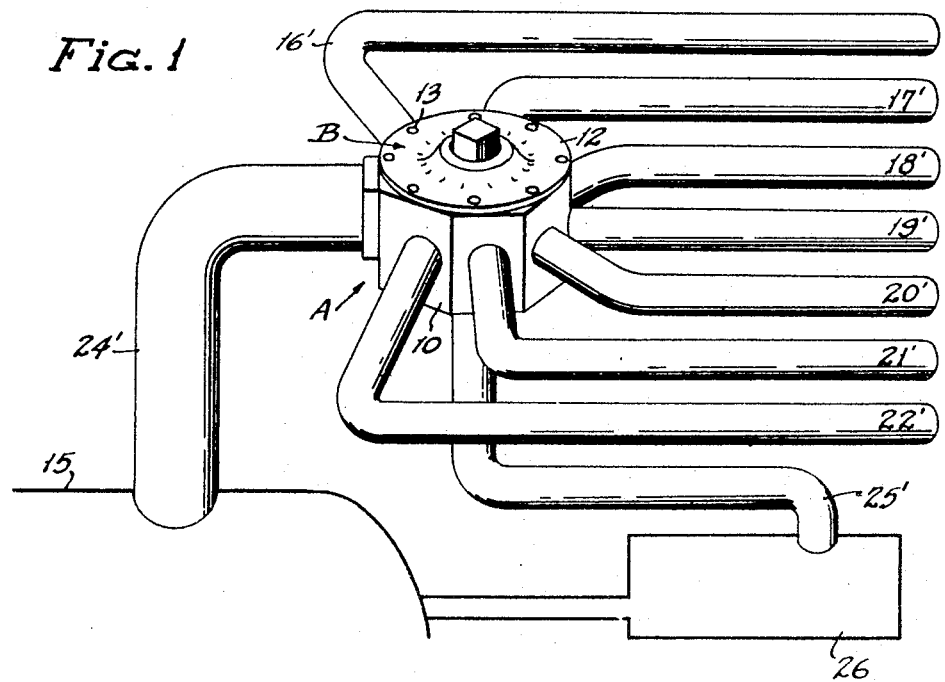
Fig. 1 is a perspective view of a selector valve embodying my invention.
Figure 2:
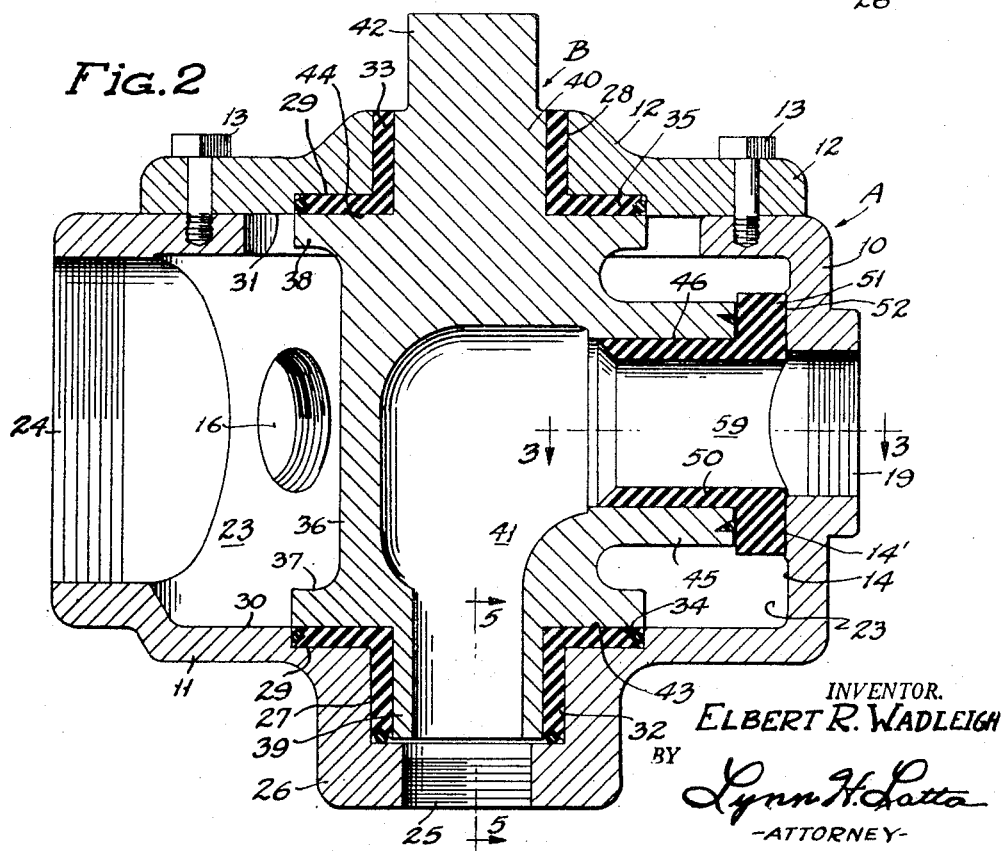
Fig. 2 is an axial sectional view thereof.

Referring now to the drawings in detail, I have shown, as an example of one form in which the invention may be embodied, a rotary selector valve including, in general, a casing A and a rotor B. Casing A includes a main body section having a lateral, peripheral wall section 10, a bottom end section 11, and an opposed top end section consisting in a separate cap 12 which is detachably secured to peripheral section 10 by any suitable means such as cap screws 13. Peripheral section 10 has an internal lateral wall 14, at least a portion of which (indicated at 14') consists in an accurately ground or otherwise machined or finished cylindrical wall. The axis of generation of cylindrical wall 14 is the rotary axis of the valve. A plurality of inlet ports 16, 17, 18, 19, 20, 21 and 22 open through cylindrical wall 14 into a valve chamber 23 that is defined within the casing A. A much larger port 24, functioning as a service outlet port, communicates with chamber 23 through lateral wall 14. An axial port 25 extends through one of the end members 11, 12 of the casing A (being shown as extending downwardly through bottom end member 11) and is defined in a boss 26 integral with end member 11. Ports 16–22, 24 and 25 are preferably internally threaded, as shown, for connection thereto of inlet conduits 16', 17', 18', 19', 20', 21' and 22'; and service line and sampling line outlet conduits 24' and 25' respectively. At this point, it may be pointed out that where the valve is used to handle the flows coming from a group of oil wells to a common delivery duct 24' leading to a storage tank 15, the valve is adapted to simultaneously gather and merge the incoming flows from the conduits 16'–22' and to deliver them to service outlet duct 24', with the exception of a selected one of the incoming lines which is segregated from the merging flows and is connected separately to the sampling outlet line 25' leading to sampling apparatus 26. Thus, while the production of six of the wells connected to the valve is being merged and delivered through duct 24' to a storage tank 15, the flow from any selected one of the incoming lines may be separately directed through outlet conduits 25' to sampling or testing equipment 26. Furthermore without interrupting the flow of liquid through the valve, the valve may be shifted so as to transfer the sampling connection to any other or all of the remaining incoming lines in succession, while the flow from a line previously sampled, together with one from other incoming lines, is directed through the common service outlet 24 to the service delivery duct 24'.

Each of the inlet ports 16–22 is entirely surrounded by the finished cylindrical internal wall 14' of the casing, so that the rotor B can be fully sealed thereto around any selected inlet port.

In bottom section 11 of the casing is a counterbore 27 adjoining and coaxial with port 25. In cap 12 is a bore 28 in opposed, coaxial relation to counterbore 27. Counterbore 27 and bore 28 at their inner ends communicate with flat shallow counterbores 29 disposed in the respective internal end walls 30 and 31 of the bottom section 11 and cap 12 respectively. Mounted in counterbore 27 and bore 28 are a pair of opposed bushings 32 and 33 having respective end flanges 34, 35 respectively, projecting radially from their inner ends and seated in the respective shallow counterbores 29. Bushing units 32, 34 and 33, 35 function both as bearings and as seals.

Rotor B comprises a central body section 36 of generally cylindrical form having, at its respective ends, heads 37, 38 which bear against the end flanges 34, 35 of bushings 32, 33 respectively. Projecting axially beyond heads 37, 38 are integral trunnions 39, 40, snugly fitted within the respective bushings. Trunnion 39 is hollow, providing one end of an L-shaped transfer passage 41 that is defined in rotor B and provides communication with sampling port 25. Trunnion 40 may be solid and is preferably formed as an integral, coaxial continuation of head 38, which is closed. Trunnion 40 is continued externally of the casing to provide a wrenching stem 42 which may have squared or hexagonal sides for cooperation with the wrench used for rotating the rotor B.

The material of bearing bushings 32, 34 and 33, 35 is trifluoroethylene, commonly known by the trade name "Teflon," a yielding, elastic, exceedingly tough material having exceptionally high wearing characteristics and having the quality of slowly cold flowing under pressure so as to conform to surfaces pressing thereagainst. In the assembly of the valve, when the cap 12 is attached and cinched down tightly against peripheral section 10, flanges 34 and 35 are placed under light compression. This is provided for by observing close tolerances in the axial dimensions of the valve including the thicknesses of flanges 34 and 35, the distance between the end shoulders 43 and 44 respectively of heads 37 and 38, and the distances between the flat bottoms of shallow counterbores 29. Thereafter, fluid pressure acting against the peripheries of flanges 34 and 35 through the open spaces between heads 37, 38 and counterbores 29, will tend to thicken the flanges 34, 35 so as to maintain a fluid tight seal between heads 37, 38 and the bottom and cap members 11 and 12 respectively. In such thickening and sealing operations, the cold flowing characteristics of the Teflon material are essential to the sealing results that are obtained.

The thickening effect is amplified at the peripheries of flanges 34, 35 by providing therein V-grooves 65 (Fig. 5) which define chevron edges at said peripheries, and by utilizing O-rings 66 which are received in grooves 65 and interposed between the peripheries of the flanges 34, 35 and the cylindrical shoulder walls 67 defining the peripheries of counterbores 29. Fluid pressure seeping into the space between the periphery of a flange 34 or 35 and a shoulder 67 will act to spread the chevron edges of the flange, thus increasing the thickening action described above. In addition, the fluid pressure will wedge the O-ring 66 against the edge which is remote from the point of application of the pressure, wedging it between the frusto conical wall of this edge portion and the cylindrical wall 67, thus further sealing the flange to the casing.

A similar construction is utilized between the outer end of bushing 32 and the shoulder wall 68 defining the bottom of counterbore 27, an O-ring 69 being interposed between the wall 68 and a V-groove 70 in the end of bushing 32. The thickening action and O-ring sealing action are the same as at the periphery of flange 34.

Rotor B includes a lateral arm 45 provided with a cylindrical bore 46 in which is mounted the skirt portion 50 of a tubular seal member having a head 51 in the general form of a radial flange extending outwardly from the outer end of skirt 50. Head 51 (Fig. 3) is of varying thickness at its periphery, its end face 52 being of segmental cylindrical curvature conforming to the curvature of cylindrical wall 14 of the casing. End face 52 seats snugly against cylindrical wall 14 to provide a fluid tight sealing connection between the seal 50 and the peripheral section 10 of the casing. Head 51 is sealed to the end of arm 45 by an O-ring 53 which is seated in an annular end groove 54 in the end of arm 45. Groove 54 is of V-shape, of saw-tooth form, with a cylindrical outer wall and a frusto conical inner wall 55. O-ring 53 is engaged between the groove 54 and a flat inner shoulder face 56 of head 51. At its opposite end, skirt 50 is beveled at 57. Fluid pressure acting against beveled end 57, which is highly flexible, dilates the same to seal it tightly against the walls of bore 46. The beveled end 57 is preferably extended to a feather edge to attain maximum fluid pressure energized dilation.

The O-ring 53, of elastic material such as Neoprene or other oil resistant soft rubber material, functions as a spring to project the outer face of head 51 snugly against the inner wall 14 of the casing. Back pressure in the chamber 23 of the casing, seeping between head 51 and the end of arm 45 and acting inwardly against O-ring 53, opposes the tendency of the O-ring to ride to the bottom of groove 54 under the camming action of frusto concial wall 55, and wedges the O-ring tightly between frusto conical wall 55 and the shoulder face 56 to seal against the entry of such back pressure between skirt 50 and bore 46 (which, if it occurred, would oppose and negate the fluid pressure energized dilation of the inner end of skirt 50 of beveled edge 57).

Seal 50, 51, defines a receiving port 59 at the outer extremity of elbow passage 41. Port 59 is arranged to communicate selectively with any one of the inlet ports 16–22.

It may now be noted that when rotor B is adjusted to bring its receiving port 59 into communication with any selected one of the inlet ports, all of the remaining inlet ports are in direct communication with the common service outlet 24, whereas the selected inlet port (e. g. port 19 in Fig. 6) is cut off from the chamber 23 and is connected with the sampling outlet port 25.

The seal member 50, 51, like gaskets 32, 33, 34, 35, is of Teflon material and is adapted to cold flow into snug seating engagement with the surfaces of counterbore 46 and casing wall 14 so as to provide and retain a good seal between the casing and the rotor under adverse conditions of wear, such as is caused by particles of fine sand, dirt etc., carried in suspension in the flows of crude oil entering the valve from the lines 16'–22'. Furthermore, the material has an exceptionally high wear resistance such that, over extended periods of service, it does not become worn sufficiently to render it ineffective to maintain a good seal. Also, when the period of service has extended to the point where the seal commences to become somewhat loose, the seal can be renewed by replacing the O-ring 53 with an O-ring of somewhat larger cross sectional diameter.

I claim:

1. In a rotary gathering and sampling selector valve for merging all but a selected one of a multiplicity of inflows into a common service outflow while simultaneously segregating said one inflow and directing it separately through the valve to provide a sampling outflow, in combination: a casing having opposed interior end walls and an interior lateral wall cooperatively defining a valve chamber having a cylindrical bearing wall constituting at least a portion of said lateral wall, having a rotor axis to which said cylindrical bearing wall is concentric, having a multiplicity of radial inlet ports opening into said chamber through said cylindrical bearing wall and entirely surrounded thereby, having a relatively large radial service outlet port in said lateral wall, said outlet and inlet ports being spaced circumferentially about said lateral wall, and said casing having a sampling outlet port extending axially from one of said end walls, having a counterbore in the inner portion of said outlet port, and having a valve stem bore extending axially from the other of said end walls, said bore and counterbore being in axially opposed relation, centered on said rotor axis, and each having at its inner end a flat shallow counterbore disposed at the plane of the respective end wall; a pair of opposed gaskets of yieldable, resilient, wear resistant material, including respective cylindrical skirts in lining relation to said bore and counterbore respectively, and respective radial flanges projecting outwardly from the inner ends of the respective skirt portions and seated in said shallow flat counterbores respectively; a rotor of T-form, including a central body portion having axially opposed heads provided with respective end bearing shoulders seated against said radial flanges respectively and thereby sealed to the respective end walls of said casing, including respective end trunnions projecting axially beyond said heads and received in the respective gasket skirts, and including a lateral arm projecting radially from said central body and terminating in a bore having a smoothly finished cylindrical internal wall; said rotor having a transfer passage of elbow form, with one end thereof extending axially through one of said trunnions and communicating with said sampling outlet port, and with its other end joined to said lateral arm bore, the other of said trunnions being closed, and said rotor further including an actuating stem integral with and projecting from said other trunnion, journalled in the skirt of the adjoining gasket, and extending externally of the casing for actuation of the valve; an annular seal of yieldable, resilient, wear resistant material defining in said rotor a receiving port adapted to selectively communicate with one of said inlet ports, said seal including a cylindrical skirt received in said lateral arm bore and fitted to said cylindrical wall thereof in sealing engagement therewith, and a head projecting radially outwardly from the outer end of said skirt and having a segmental-cylindrical end face conforming to and seated against said cylindrical wall of the casing to seal said receiving port to the selected inlet port.

2. A selector valve as defined in claim 1, wherein said skirt has its inner end internally bevelled and terminating in a feather edge adapted to be dilated in response to fluid pressure in said receiving port.

3. A valve as defined in claim 2, wherein the outer end of said lateral arm of the rotor is provided with an end-opening annular groove of V-section having a frusto conical wall on the side thereof adjacent said lateral arm bore, wherein said annular seal head is provided with an annular shoulder adjacent said end of the lateral arm and providing a ring seat; and including an O-ring of resilient, compressible material interposed between said ring seat and said annular groove and adapted, in response to back pressure of fluid in said casing chamber around said lateral arm, to establish a seal between said frusto conical wall and said ring seat to exclude said back pressure from said annular arm bore so as to maintain the effectiveness of said pressure energized dilation seal of the inner end of said skirt portion against said lateral arm bore wall.

4. A valve as defined in claim 1, wherein the near end of said annular seal skirt is adapted for pressure-energized dilation into tight sealing engagement with said lateral arm bore wall in response to fluid pressure in said receiving port; wherein the outer end of said lateral arm is provided with an annular groove of V-section having a frusto conical wall on the side thereof adjacent said lateral arm bore, wherein said annular seal head is provided with an annular shoulder adjacent said end of the lateral arm and providing a ring seat; and including an O-ring of resilient, compressible material interposed between said ring seat and said annular groove and adapted, in response to back pressure of fluid in said casing chamber around said lateral arm, to establish a seal between said frusto conical wall and said ring seat to exclude said back pressure from said annular arm bore so as to maintain the effectiveness of said pressure energized dilation seal of the inner end of said skirt portion against said lateral arm bore wall.

5. A valve as defined in claim 1, wherein the near end of said annular seal skirt is adapted for pressure-energized dilation into tight sealing engagement with said lateral arm bore wall in response to fluid pressure in said receiving port; wherein the outer end of said lateral arm is provided with an annular groove of V-section having a frusto conical wall on the side thereof adjacent said lateral arm bore, wherein said annular seal head is provided with an annular shoulder adjacent said end of the lateral arm and providing a ring seat; and including an O-ring of resilient, compressible material interposed between said ring seat and said annular groove and adapted, in response to back pressure of fluid in said casing chamber around said lateral arm, to establish a seal between said frusto conical wall and said ring seat to exclude said back pressure from said annular arm bore so as to maintain the effectiveness of said pressure energized dilation seal of the inner end of said skirt portion against said lateral arm bore wall; said lateral arm having a thin cylindrical lip defining a cylindrical wall as the outer wall of said annular groove.

6. A valve as defined in claim 1, including a compressible elastic ring registering with the outer end of said lateral arm, interposed under compression between said outer end and said seal head, and loading said head with a light yielding pressure to maintain snug contact between said segmental cylindrical end face and said cylindrical casing wall; said outer end having an annular groove in which said ring is seated.

7. A valve as defined in claim 1, wherein said annular seal is of tetra-fluoroethylene material having exceedingly high resistance to wear and its outer face against said casing wall, wherein said lateral arm has at its outer end an end opening annular groove of V-section, and including an O-ring of compressible, resilient, elastic material, interposed under compression between said groove and the inner side of said annular seal head and having an elasticity such that it functions as a spring for loading said head into seating engagement with said casing wall.

8. A valve as defined in claim 1, wherein said lateral rotor arm has in its outer end an end-opening annular groove of V-section, wherein said annular seal head has on its inner side a radial annular shoulder providing a ring seat in closely spaced axially opposed relation to said outer end, and including an O-ring of normally circular cross section, engaged under compression in said annular groove, between the walls thereof and said ring seat, said O-ring being of compressible resilient material having a relatively high elasticity such as to spring-load said annular seal head into tight sealing engagement with said casing wall; said O-ring further functioning to provide a fluid pressure energized seal between said lateral arm and said annular seal.

9. A valve as defined in claim 1, wherein the respective end members of said casing have cylindrical walls defining the peripheries of said shallow flat counterbores and providing ring seats; wherein said radial gasket flanges have peripheral grooves of V-section in adjacent opposed relation to said ring seats, said annular grooves defining opposed lips of chevron form at the periphery of each radial flange; and including O-rings of compressible, resilient material engaged under compression in said grooves and between the walls thereof and the respective ring seats, said O-rings being operable, in response to their own elasticity, augmented by back pressure of fluid in said casing chamber, to exert a spreading action against said flange lips to expand the peripheral portions of said radial flanges into snug sealing engagement with said end bearing shoulders and the flat bottoms of said shallow counterbores respectively.

10. A valve as defined in claim 1, wherein the respective end members of said casing having cylindrical walls defining the peripheries of said shallow flat counterbores and providing ring seats; wherein said radial gasket flanges have peripheral grooves of V-section in adjacent opposed relation to said ring seats, said annular grooves defining opposed lips of chevron form at the periphery of each radial flange; and including O-rings of compressible, resilient material engaged under compression in said grooves and between the walls thereof and the respective ring seats, said O-rings being operable, in response to their own elasticity, augmented by back pressure of fluid in said casing chamber, to exert a spreading action against said flange lips to expand the peripheral portions of said radial flanges into snug sealing engagement with said end bearing shoulders and the flat bottoms of said shallow counterbores respectively; wherein the outer end of the skirt of the gasket adjacent said sampling port is provided with an end opening annular groove of V-form defining a pair of radially opposed annular lips of chevron form; wherein the casing is provided with a radial shoulder as the bottom of the counterbore adjacent said sampling port, providing a ring seat in closely spaced opposed relation to said outer end of the last mentioned gasket; and including an O-ring of resilient compressible material, under compression between said last mentioned groove and ring seat and adapted in response to its own elasticity, amplified by fluid pressure in said sampling port, to expand said outer end of said last mentioned skirt into snug sealing engagement with the respective casing bore in which it is received, and with the respective trunnion.

No references cited.